United States Patent [19]

Mitzel

[11] 4,068,385

[45] Jan. 17, 1978

[54] APPARATUS FOR MEASURING THICKNESS DIFFERENCES IN RECORD CARRIERS, SUCH AS BANK NOTES AND THE LIKE

[75] Inventor: Wilhelm Mitzel, Neukaeferloh, Germany

[73] Assignee: G.A.O. Gesellschaft fur Automation und Organisation m.b.H., Germany

[21] Appl. No.: 704,482

[22] Filed: July 12, 1976

[30] Foreign Application Priority Data

July 15, 1975 Austria .................... 5470/75

[51] Int. Cl.² .......................... G01B 7/06; B07C 5/08
[52] U.S. Cl. .................... 33/143 L; 33/147 L; 33/147 N; 73/159; 209/88 S
[58] Field of Search ............ 33/143 L, 147 L, 147 N, 33/147 B, 147 D, DIG. 13; 73/94, 159; 209/79, 88 S

[56] References Cited

U.S. PATENT DOCUMENTS

| 1,453,438 | 5/1923 | Butterfield et al. ............... 33/147 L |
| 2,337,064 | 12/1943 | Peters ................................ 209/88 S |
| 2,632,545 | 3/1953 | Schubert ........................... 209/88 S |
| 3,763,483 | 10/1973 | Urmenyi ........................... 33/147 N |
| 3,796,094 | 3/1974 | Cook et al. ............................ 73/94 |
| 3,899,831 | 8/1975 | DeLeon ............................ 33/143 L |
| 3,919,779 | 11/1975 | Piggott ............................. 33/147 L |

FOREIGN PATENT DOCUMENTS 1,094,643  12/1954  France ................. 33/147 L

Primary Examiner—Richard E. Aegerter
Assistant Examiner—Richard R. Stearns
Attorney, Agent, or Firm—McGlew and Tuttle

[57] ABSTRACT

The apparatus comprises a roll, having an elastic surface, mounted for rotation about a fixed axis with the elastic surface arranged to engage one surface of a record carrier. A piezoelectric transducer is mounted perpendicular to the axis of the roll and rigidly with respect to the roll, and a sensor is mounted quasi-rigidly, with respect to the transducer, between the roll and the transducer, the sensor being fixedly joined to the transducer. In the quiescent condition, without a record carrier being passed between the sensor and the roll, the distance from the roll surface to the sensor is smaller than the smallest paper thickness to be measured. The transducer is mounted in a holder having a spring member fixedly joining the sensor to the transducer. The sensor may include a sensing roll or may be designed as a sensing runner with a sharp edge, and an elastic damping plate connects the transducer to the sensor.

8 Claims, 5 Drawing Figures

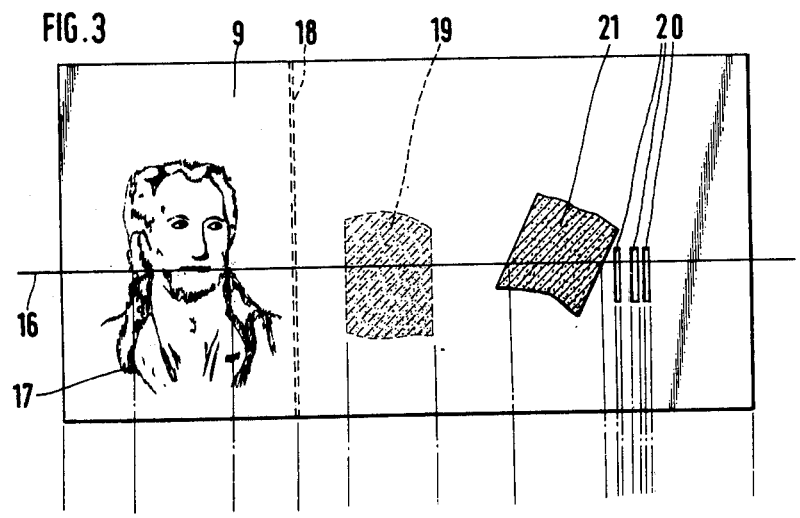

APPARATUS FOR MEASURING THICKNESS DIFFERENCES IN RECORD CARRIERS, SUCH AS BANK NOTES AND THE LIKE

FIELD OF THE INVENTION AND BACKGROUND OF THE PRIOR ART

The present invention relates to an apparatus for measuring thickness differences in record carriers, such as bank notes and the like.

German Published Application (DT-OS) 1,474,903 discloses a bank note checking device wherein, while the bank note is moving through the checking device, the surface of the bank note is sensed by means of a sensor in order to obtain a test signal dependent on the surface contour. Via a lever transmission, the deflections of the sensor are passed on to a piezoelectric pressure transmitter, operating, in principle, like a phonograph pickup, or to a resistance strain gauge arrangement, with the deflections of the sensor generating the test signal.

Since, with this device, the possibility of damaged bank notes being caught by the sensor and, consequently, of the checking device or of the bank notes being destroyed cannot be excluded, the use of such a thickness gauge appears to be not entirely unproblematic. Since, in addition, the upper limit frequency of this device depends primarily on the spring/mass system of the arrangement, and since the small thickness differences to be measured require large magnitude gear ratios in order to obtain useful signals, the upper limit frequency of the device is relatively low, so the bank notes can only be checked very slowly.

German Published Application (DT-OS) 2,423,094 discloses another bank note checking device wherein, following the principle of the above-described device, the bank note is passed over a rotating drum, and its surface contour is sensed along at least one line parallel to the edge by means of a stationary leaf spring. Via a lever arrangement and a piezoeletric device, the deflections of the leaf spring generate signals which are proportional to the thickness of the paper. Through the use of a leaf spring, the risk of the bank notes and of the sensor being damaged must be negligibly small with this thickness gauge, but since the construction corresponds in principle to that of the first-mentioned publication, this device, too, has the disadvantages of the low processing speed.

Since both of the known checking devices sense only the surface contour of one side of a bank note, they suffer from the additional drawback that authentic changes in paper thickness cannot be distinguished from impressions where the surface of the paper is deformed, too, while the thickness is substantially the same. Therefore, counterfeit bank notes with impressed watermarks will, in all probability, be accepted by these devices as valid.

SUMMARY OF THE INVENTION

The object of the invention is, therefore, to provide an apparatus for checking the thickness of record carriers which permits thickness differences in record carriers, such as bank notes and the like, to be measured at high processing speed and without risk of damage.

The invention is characterized by a roll with an elastic surface and by a transducer mounted perpendicular to the rotation axis of the roll and rigidly, as well as by a sensor which is mounted quasi-rigidly between the roll and the transducer, is fixedly joined to the transducer, and is arranged so that, in the quiescent condition of the arrangement, i.e. without a test piece being passed between the sensor and the roll, the distance from the roll surface is smaller than the smallest paper thickness to be measured.

The measuring principle of the invention is thus based on a force measurement in which a rigidly mounted sensor connected with an transducer presses the test piece against an elastic roll serving as a spring element and rigidly mounted in relation to the sensor, and in which the different forces resulting from different paper thicknesses provide a measure of thickness. With this thickness measurement, which is reduced to a pure force measurement, a very high natural frequency of the measuring apparatus is attainable because, in principle, no inertia of the sensor has to be taken into account.

The choice of the elastic roll material, which serves as a spring element and of which only the respective portion facing the sensor is used, turns out to be relatively uncritical, because the relaxation times of the elastic material can be relatively high. The center of pressure does not return to the measuring position until after one complete revolution of the roll and thus has sufficient time to return to the original position. Thus, the upper limit frequency and also the natural frequency of the thickness gauge are determined substantially only by the natural frequency of the sensor. With a sufficiently sensitive transducer, therefore, a very high limit frequency can be achieved by choosing a relatively unelastic material for the spring element.

In an improvement of the invention, the sensor, for checking general changes in paper thickness, is equipped with a sensing roll from which the forces resulting from different paper thicknesses are passed on to the transducer, which is preferably designed as a piezoelectric transducer. To measure thickness changes of particularly high frequency, however, use is made of a sensor designed as a sensing runner with a sharp edge. It is also possible to design the transducer pin so that it can be used directly as the sensor. For suppressing natural vibrations of the sensing-roll system, a small elastic plate may be additionally provided between the sensor and the transducer. Depending on the design of the sensor and on the hardness of the roll surface, working frequencies up to about 20 kHz can be achieved with this measuring apparatus. Compared to conventional apparatus, whose upper limit frequency is about 2 kHz, this represents a tenfold increase of the limit frequency.

In addition, the special design of the sensor, which excludes the possibility of the test piece becoming caught or being damaged, allows the measuring apparatus to be adapted to the thickness changes to be measured. For example, relatively coarse differences in thickness, as are caused by watermarks in securities will be checked with a small sensing roll, while the relief of steel intaglio print should be measured with a sharp runner because this makes it possible to sense even very closely adjacent, sharply dropping thickness zones over which the sensing roll would roll because of the diameter being large compared to the sharp edge. If coarse and fine thickness differences are to be detected simultaneously, the sensor will have to be adapted in a suitable manner to the upper working frequency to be expected.

Since, in addition to the surface contour of the test piece being sensed, the squeezing force produced by the thickness of the paper between the sensor and the roll is used as a measure, any deception by impressions is impossible. Counterfeit watermarks can, therefore, be distinguished from authentic watermarks at any time.

BRIEF DESCRIPTION OF THE DRAWINGS

Further features and advantages of the invention will be apparent from the claims and from the following description of preferred embodiments of the invention, in which:

FIG. 3 shows a bank note with a test track;

FIG. 4 shows the signals obtained in the measurement of the bank note of FIG. 3.

DESCRIPTION OF THE PREFERRED EMBODIMENTS

Figure 1:
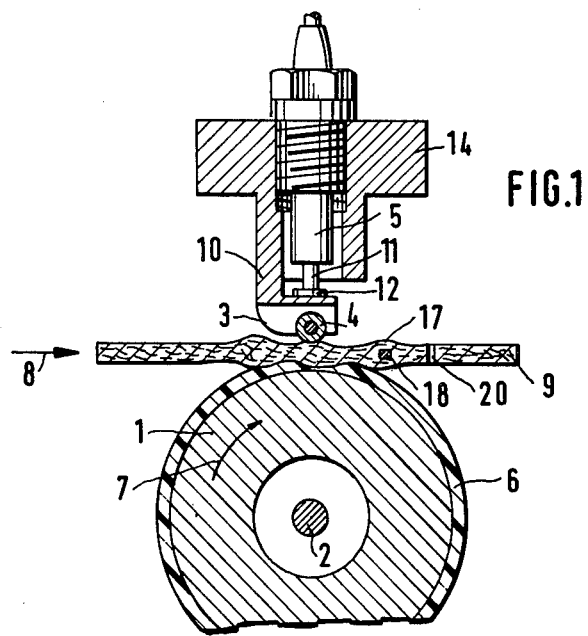
FIG. 1 shows a thickness-measuring apparatus according to the invention the sensor of which is provided with a roll.

FIG. 1 shows a thickness-measuring apparatus constructed on the measuring principle according to the invention and serving to check, for example, a bank note provided with a safety thread and a watermark and having additional thickness changes in the form of adhesive tapes 19, 21. The apparatus substantially comprises a roll 1 rotatably mounted in the housing (not shown) of the measuring apparatus by means of a fixed bearing 2 and having an elastic surface 6, a sensor 3 equipped with a sensing roll 4, and a transducer 5 which, designed as a piezoelectric transducer, is mounted rigidly relative to the fixed bearing 2, and is in permanent contact with the sensor 3. Transducer 5 is mounted in a holder 14 having a spring member 10 mounting sensor 3. The sensor 3 and the transducer 5 are preferably so mounted above the roll 1, which is driven by a conveyor system 22, that even the thinnest spot of the test piece will yield a signal component capable of being evaluated. If the paper is likely to have very thin spots, it may also be desirable to adjust the sensing roll 4 so that it is in permanent contact with the roll 1. To avoid unnecessary wear, however, a gap corresponding to the smallest possible paper thickness will be provided, as far as possible. In this case, however, paper thicknesses smaller than this gap width are not measurable. An elastic damping plate 12 connects transducer 5 to sensor 3.

As can also be seen from FIG. 1, the bank note 9, delivered from the direction of the arrow 8, is grasped upon reaching the point where the sensing roll 4 and the roll 1, driven in the direction of the arrow 7, stand opposite each other, and is pulled between the sensing roll 4 and the roll 1. According to the thickness of the paper, the elastic material of the roll 1 will be more or less compressed, and a more or less great force will act on the sensing roll 4 and, consequently via the transducer pin 11 on the transducer 5, which force will generate a proportional voltage in the structure of the piezoelectric crystal of the transducer. To permit the respective forces to act on the piezoelectric crystal of the transducer, it is necessary to slightly deflect the transducer pin 11 in the axial direction, i.e. in the direction of the crystal, which is made possible by the relatively thin and limitedly elastic arm 10, acting as a resilient member, of the sensor and by transducer holder 14. Since, according to the transducer used, these deflections lie in the range of one thousandth of a millimeter even if the thickness differences amount only to a few tenth of a millimeter, they can be neglected in the following considerations. To indicate this fact, the sensor is, therefore, referred to as being "quasi-rigid".

Since piezoelectric transducers are commercially available, their operation will not be described here.

If the bank note 9 is passed between the roll 1 and the sensor 3 in the direction of the arrow 7, the sensing roll 4 of the quasi-rigidly mounted sensor 3 will press it more or less deeply, depending on the thickness of the paper, into the elastic material of the roll 1. Since the elastic surface of the roll acts as a spring, forces are produced which generate in the transducer 5 the desired voltage signals proportional to the thickness of the paper. These signals are conditioned, in known manner, for further processing.

Figure 2:
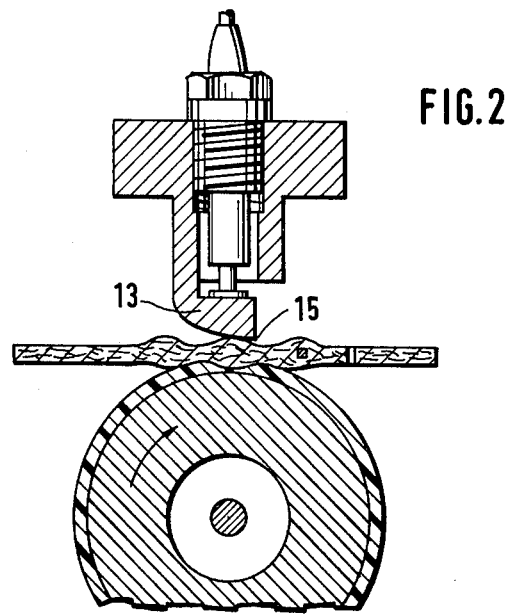
FIG. 2 shows a thickness-measuring apparatus according to the invention with a sensor designed as a runner.

FIG. 2 shows another embodiment of the invention in which the sensor is designed as a sensing runner. The runner ensures a smooth entrance of the bank note, but thanks to the sharp edge 15, it accurately senses the finest thickness changes, which also may be abrupt and follow in quick succession. This sensor will be particularly advantageous if the thickness changes in the test piece have steep leading or trailing edges because the edge 15 can easily follow the resulting corners, while with a sensing roll, closely adjacent edges will be "rolled over" and, therefore, not be registered.

Thus, even higher frequencies, i.e. even closer profile changes, can be measured.

The generation of the measuring signals will now be explained in more detail with the aid of FIGS. 3 and 4. FIG. 3 shows schematically a bank note 9 with different thickness changes. A portrait watermark 17 is followed by a safety thread 18, an adhesive tape 19 stuck on the rear, an adhesive tape 21 on the front side, and three cuts 20 of different width.

FIG. 4 shows the output signals of the transducer 5 during the measurement of the bank note of FIG. 3. In the initial state, the signal voltage of the transducer 5 is nearly zero, leaving a slight noise level out of account. After the bank note 9 has entered the measuring apparatus, the signal voltage rises steeply to a level which corresponds to the thickness of the paper. Since the bank note paper partially consists of very coarse paper fibres, and since the steel intaglio influences the thickness profile of the paper, too, more or less large signal voltages are obtained in those areas where no deliberate thickness changes have been made. Since this noise, which is due to the paper cloudiness and the print, is much finer and has considerably smaller amplitudes, however, it differs quite clearly from the thickness-change signals of the watermark area and of the safety thread.

When the adjesive tapes 19 and 21 are reached, the voltage curve again rises steeply, as at the entrance of the bank note into the measuring apparatus, remains at this value, and then drops sharply back to the normal level. By contrast, during the passage of the slot-like cuts 20, the signal drops briefly to about zero three times. Then, until the end of the bank note, it again assumes the magnitude corresponding to that at the beginning of the bank note, slightly varying about the average level.

Figure 5:
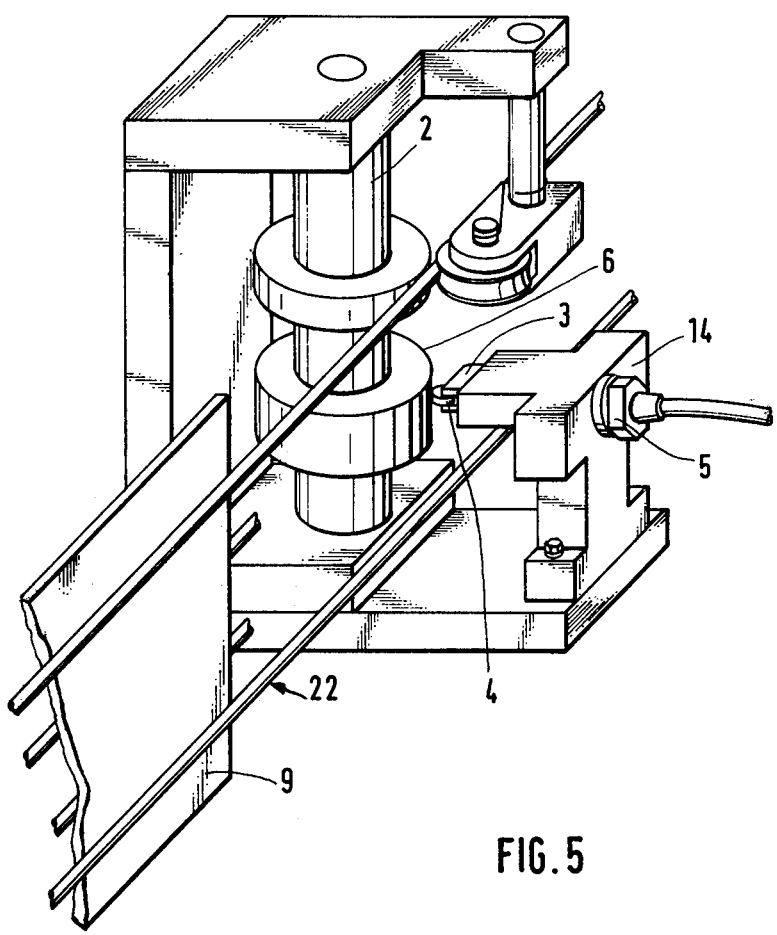
FIG. 5 is a three-dimensional view of the measuring apparatus of FIG. 1.

The three-dimensional view of FIG. 5 is to illustrate the measuring apparatus more clearly and shows that the measurement is performed with the bank note in motion. By parallel arrangement of several elastic rolls 6 on the rotating shaft 2 and by use of a corresponding number of transducer arrangements 3, 4, 5, 14, sensing can be performed in several tracks. Since this figure is self-explanatory, only the band conveyor system 22, which conveys the bank note 9, is mentioned here.

What is claimed is:

1. Apparatus for measuring thickness differences in record carriers, such as bank notes and the like, comprising, in combination, a roll mounted for rotation about an axis and having an elastic surface; a transducer defining a sensing axis mounted perpendicular to the axis of rotation of said roll and rigidly with respect to said roll axis; and a sensor mounted quasi-rigidly, with respect to said transducer, between said roll and said transducer and fixedly joined to said transducer; said sensor being so positioned that, in the quiescent condition of the arrangement without a record carrier being passed between said sensor and said roll, the spacing of said roll surface from said sensor is less than the smallest paper thickness to be measured.

2. A measuring apparatus according to claim 1 in which said transducer is a piezoelectic transducer.

3. A measuring apparatus, according to claim 1 in which said sensor is equipped with a sensing roll.

4. A measuring apparatus according to claim 1, including a transducer holder having a spring member fixedly joining said sensor to said transducer.

5. A measuring apparatus as claimed in claim 4, in which said transducer is a piezoelectric transducer.

6. A measuring apparatus according to claim 1, in which said sensor comprises a sensing runner having a sharp trailing edge.

7. A measuring apparatus according to claim 1, including an elastic damping plate connecting said transducer to said sensor.

8. A measuring apparatus according to claim 1, in which said transducer includes a pin.

* * * * *